US008940122B2

(12) United States Patent
Cohen et al.

(10) Patent No.: US 8,940,122 B2
(45) Date of Patent: Jan. 27, 2015

(54) PROTECTIVE ADHESIVE FILM, METHOD OF ADHERING PROTECTIVE ADHESIVE FILM TO A DEVICE, AND DEVICE COMPRISING PROTECTIVE ADHESIVE FILM

(75) Inventors: Lewis S. Cohen, Needham, MA (US); Juan Maldonado, Pomona, CA (US); Igor Muravyov, Brookline, MA (US); Brett G. Webster, Needham Heights, MA (US)

(73) Assignee: Wrapsol Acquisition, LLC, Fort Collins, CO (US)

( * ) Notice: Subject to any disclaimer, the term of this patent is extended or adjusted under 35 U.S.C. 154(b) by 251 days.

(21) Appl. No.: 13/044,275

(22) Filed: Mar. 9, 2011

(65) Prior Publication Data

US 2011/0267793 A1    Nov. 3, 2011

Related U.S. Application Data

(60) Provisional application No. 61/313,363, filed on Mar. 12, 2010, provisional application No. 61/316,185, filed on Mar. 22, 2010, provisional application No. 61/359,690, filed on Jun. 29, 2010, provisional application No. 61/440,708, filed on Feb. 8, 2011.

(51) Int. Cl.
*B44C 1/17* (2006.01)
*B29C 65/54* (2006.01)
*B32B 37/26* (2006.01)
(Continued)

(52) U.S. Cl.
CPC ............. *B29C 63/0047* (2013.01); *B29C 63/48* (2013.01); *B29C 2063/027* (2013.01); *B29L 2031/3061* (2013.01); *B29C 63/08* (2013.01)

USPC ........... 156/247; 156/230; 156/232; 156/234; 156/249; 156/267; 156/289

(58) Field of Classification Search
USPC ......... 156/247, 249, 250, 267, 289, 230, 232, 156/234
See application file for complete search history.

(56) References Cited

U.S. PATENT DOCUMENTS 4,873,270 A    10/1989  Aime et al.
5,083,979 A     1/1992  Burt
(Continued)

FOREIGN PATENT DOCUMENTS

EP    1018680 A2    7/2000
EP    1 939 263 A1   2/2008
WO   2009105297 A2   8/2009

OTHER PUBLICATIONS

NLU Video Tape No. 1 (along with screenshots and transcript thereof) of the Application of NLU BodyGuardz film to ipod published on YouTube on Nov. 20, 2006.
(Continued)

*Primary Examiner* — Sing P Chan
(74) *Attorney, Agent, or Firm* — Mintz Levin Cohn Ferris Glovsky and Popeo, P.C.

(57) ABSTRACT

A protective adhesive film may include a polyurethane sheet and an adhesive layer disposed on at least a portion of a first major surface of the polyurethane sheet. The adhesive layer may comprise a pressure-sensitive adhesive that includes an acrylate polymer and a silicone macromer. The adhesive layer may adhere to a surface of an electronic device without the application of any liquid or additive to the adhesive layer or the surface of the electronic device.

36 Claims, 8 Drawing Sheets

(51) Int. Cl.
  B32B 38/10   (2006.01)
  B32B 43/00   (2006.01)
  B29C 63/00   (2006.01)
  B29C 63/08   (2006.01)
  B29C 63/48   (2006.01)
  B29C 63/02   (2006.01)
  B29L 31/30   (2006.01)

(56) References Cited

U.S. PATENT DOCUMENTS

| | | | |
|---|---|---|---|
| 5,132,588 A | 7/1992 | Warman | |
| 5,388,691 A | 2/1995 | White | |
| 5,499,713 A | 3/1996 | Huffer | |
| 5,514,730 A | 5/1996 | Mazurek et al. | |
| RE35,318 E | 8/1996 | Warman | |
| 5,548,306 A | 8/1996 | Yates et al. | |
| 5,732,414 A | 3/1998 | Monica | |
| 5,965,256 A * | 10/1999 | Barrera | 428/354 |
| 6,017,079 A | 1/2000 | Warner | |
| 6,054,009 A * | 4/2000 | Cote et al. | 156/249 |
| 6,227,599 B1 | 5/2001 | Campfield et al. | |
| 6,406,758 B1 | 6/2002 | Bottari et al. | |
| 6,415,138 B2 | 7/2002 | Sirola et al. | |
| 6,491,775 B1 | 12/2002 | Janssen et al. | |
| 6,514,624 B2 | 2/2003 | Takemoto | |
| 6,614,423 B1 | 9/2003 | Wong et al. | |
| 6,800,378 B2 | 10/2004 | Hawa et al. | |
| 6,941,056 B2 | 9/2005 | Hirota | |
| 7,054,441 B2 | 5/2006 | Pletikosa | |
| 7,158,376 B2 | 1/2007 | Richardson et al. | |
| 7,180,735 B2 | 2/2007 | Thomas et al. | |
| 7,194,086 B2 | 3/2007 | Pletikosa | |
| 7,214,432 B2 | 5/2007 | Merfeld et al. | |
| 7,290,654 B2 | 11/2007 | Hodges | |
| 7,351,470 B2 | 4/2008 | Draheim et al. | |
| 7,389,869 B2 | 6/2008 | Mason, Jr. | |
| 7,400,917 B2 | 7/2008 | Wood et al. | |
| 7,413,787 B2 | 8/2008 | Vetrovec et al. | |
| 7,529,364 B2 | 5/2009 | Buehler | |
| 7,743,929 B2 | 6/2010 | Kools | |
| 7,784,610 B2 | 8/2010 | Mason | |
| 7,799,853 B2 * | 9/2010 | Ukei et al. | 524/99 |
| 7,803,292 B2 | 9/2010 | Heki | |
| 7,957,524 B2 | 6/2011 | Chipping | |
| 7,993,482 B2 * | 8/2011 | Begon et al. | 156/307.5 |
| 8,128,779 B2 * | 3/2012 | Ho et al. | 156/277 |
| 2002/0195910 A1 | 12/2002 | Hus et al. | |
| 2003/0080947 A1 | 5/2003 | Genest et al. | |
| 2003/0110613 A1 | 6/2003 | Ross | |
| 2004/0237433 A1 | 12/2004 | Smith | |
| 2004/0246386 A1 | 12/2004 | Thomas et al. | |
| 2005/0007000 A1 | 1/2005 | Chou et al. | |
| 2005/0022924 A1 | 2/2005 | Blackburn | |
| 2005/0047589 A1 | 3/2005 | Chang | |
| 2005/0279661 A1 | 12/2005 | Hodges | |
| 2006/0024263 A1 * | 2/2006 | Van Es et al. | 424/70.16 |
| 2006/0134406 A1 | 6/2006 | Horigome et al. | |
| 2006/0158592 A1 | 7/2006 | Freking et al. | |
| 2006/0262405 A1 | 11/2006 | Brumwell | |
| 2007/0115387 A1 | 5/2007 | Ho | |
| 2007/0205118 A1 | 9/2007 | Westendorf et al. | |
| 2008/0156423 A1 | 7/2008 | Reuter | |
| 2008/0233324 A1 * | 9/2008 | Lee et al. | 428/40.1 |
| 2008/0233326 A1 | 9/2008 | Hegemier et al. | |
| 2009/0016209 A1 | 1/2009 | Ikeda et al. | |
| 2009/0087655 A1 | 4/2009 | Yamada et al. | |
| 2009/0260844 A1 | 10/2009 | Tseng | |
| 2009/0301907 A1 | 12/2009 | Mason | |
| 2010/0068446 A1 | 3/2010 | McGuire | |
| 2011/0039099 A1 * | 2/2011 | Sherman et al. | 428/355 AC |

OTHER PUBLICATIONS

NLU Video Tape No. 2 (along with screenshots and transcript thereof) of the Application of NLU BodyGuardz film to ipod nano published on YouTube on < Sep. 1, 2010.
3M Technical Bulletin, Polyurethane Protective Tape Preparation and Application Instructions, dated Oct. 2001.
iPodlounge Buyers' Guide 2004, Issue 1, Published Nov. 2004.
Declaration of Phillip John Chipping, dated Apr. 27, 2010.
"How to put a Screen protector on Apple iPhone or just any phone" (Along with screenshots and transcript thereof) Published on Aug. 26, 2008 http://www.youtube.com/watch?v=ATvjrxCXt40.
"InvisibleSHIELD DRY Install Walkthrough—iPhone 4" (Along with screenshots and transcript thereof) Published on Jul. 15, 2010 http://www.youtube.com/watch?v=vXPAuYmkJIU.
"ZAGG to Introduce invisibleSHIELD Dry(TM) Nationwide Exclusively Through AT&T"; Published on Jun. 28, 2010 http://investors.zagg.com/releasedetail.cfm?releaseid=482964 (Articte printed on Sep. 10, 2012).
"ZAGG to Introduce invisibleSHIELD Dry(TM) Nationwide Exclusively Through AT&T"; Published on Jun. 28, 2010 www.businesswire.com (Article printed on Sep. 10, 2012).
"ZAGG (ZAGG) Introduces Two New Products at CTIA Wireless Show"; Published on Mar. 24, 2010 www.streetinsider.com (Article printed on Sep. 10, 2012).
"Cast vs. Calendered Vinyl" By Judith Evans; Published Oct. 29, 2011 http://www.ehow.com/info_12184086_cast-vs-calendered-vinyl.html (Accessed on Sep. 19, 2012).
"Solution Casting Films; Extrusion Casting Film; Calendering; Casting;—Society of Plastics Engineers" Copyright © 2011 Society of Plastics Engineers (SPE) http://www.4spe.org (Accessed on Sep. 19, 2012).
"Stability in Film Casting", Olena Zavinska, Eindhoven University of Technology Published May 9, 2006 Available at www.win.tue.nl/casa/meetings/casaday/.../Film_casting_0905.ppt.
Wrapsol, LLC, "General Application," Sep. 1999, Wrapsol, LLC, Canton, Massachusetts.
"Bodyguardz," Product Packaging, 2006, NLU Products, LLC, Draper, Utah.
"Polyurethane Protective Tape, Preparation and Application Instructions," Technical Bulletin, Oct. 2001, 3M, St. Paul, Minnesota.
"Polyurethane Protective Tapes to Reduce Aircraft Floor Subsystem Corrosion Damage," Installation Bulletin, Jul. 2003, 3M, St. Paul, Minnesota.
"Polyurethane Protective Tape 8663, 8663 DL (dual liner)," Technical Datasheet, Apr. 2010, 3M, St. Paul, Minnesota.
"Protective Tape Application Solution," Technical Bulletin, Aug. 2005, 3M, St. Paul, Minnesota.
"Rotor Blade Protection Kit 8999K11," Application Guide, Jun. 2010, 3M, St. Paul, Minnesota.
Supplementary European Search Report on PCT/US2011/027915, mailed Jul. 30, 2013.
"Stability in Film Casting", Olena Zavinska, Eindhoven University of Technology Published May 9, 2006Available at www.win.tue.nl/casa/meetings/casaday/...Film_casting_0905.ppt.

\* cited by examiner

PROTECTIVE ADHESIVE FILM, METHOD OF ADHERING PROTECTIVE ADHESIVE FILM TO A DEVICE, AND DEVICE COMPRISING PROTECTIVE ADHESIVE FILM

RELATED APPLICATIONS

This application claims priority to U.S. Provisional Application No. 61/313,363, entitled "Method of Adhering a Protective Adhesive Film to a Device and Device Comprising Protective Adhesive Film," filed on Mar. 12, 2010. This application further claims priority to U.S. Provisional Application No. 61/316,185, entitled "Protective Adhesive Film, Method of Adhering Protective Adhesive Film to a Device and Device Comprising Protective Adhesive Film," filed on Mar. 22, 2010. This application further claims priority to U.S. Provisional Application No. 61/359,690, entitled "Micro-Matte Protective Film, Method of Adhering Micro-Matte Protective Film to a Device and Device Comprising Micro-Matte Protective Film," filed on Jun. 29, 2010. This application further claims priority to U.S. Provisional Application No. 61/440,708, entitled "Protective Adhesive Film, Method of Adhering Protective Adhesive Film to a Device and Device Comprising Protective Adhesive Film," filed on Feb. 8, 2011.

BACKGROUND

The present invention relates generally to methods of applying protective films to electronic device surfaces and to devices comprising protective films.

Protective films are used to cover and protect a variety of materials and devices from, for example, scratches or dents that may be imparted during transport or use of the device. Protective films may be used to protect, for example, the surface of digital electronic device components during manufacture, or may be adhered to a completed device to protect it from damage during normal day-to-day use. A variety of protective films are known, each having properties that may be advantageous for some uses and disadvantageous for other uses. One form of protective film used in the art is coated on one side with a layer of a dry pressure-sensitive adhesive that has sufficient tack to form a secure contact with the device while permitting slight repositioning of the film after adherence. Protective films are often transparent, and may permit the use of touch-sensitive features of the electronic device through the film.

Typically, when a dry protective film, particularly a protective film having an adhesive layer, is applied to a surface, air is easily trapped between a device surface and the film during application, causing the appearance of bubbles. Bubbles are undesirable for aesthetic reasons but also because their presence over an optical screen distorts images on a screen viewed by a device user. Prior methods of eliminating trapped air bubbles beneath protective films utilize an aqueous solution or other solvent to temporarily reduce adherence between a film and a device, permitting trapped air to be forced out by mechanical pressure. Known methods, for example, include spraying a protective film (or device surface) with water or another liquid, applying the wet film to the device surface to be protected (or applying the film to the wet device surface), and using pressure (e.g., with a squeegee) to smooth the film and force out any trapped air bubbles. In doing so, the water or other liquid is also forced out from between the film and the device surface, and collects at an edge of the film.

Thus, prior methods required introduction of a liquid to the outer surface of a device, requiring a user to take additional steps to remove liquid after a film is applied to a device. A significant disadvantage to using a wet solution to apply a protective film is potential introduction of liquid into an electronic device, for example, through the apertures for the speaker or head set jack. In some cases, liquid entering an interior housing of a device may cause a device to fail. For this reason, device manufacturers commonly include moisture sensitive indicators within their devices to help diagnose device failure. In some cases, a manufacturer will void a device's warranty where inspection of a device and its moisture indicators show exposure to moisture.

Another drawback of many protective films is the high visibility of fingerprints, smudges or other marks on the film, resulting, for example, from handling of a device. In particular, visibility of fingerprints or other marks on films covering electronic device bodies or display screens is aesthetically and functionally undesirable. A visible residue over a display screen, for example, may distort the transmission of light from the screen resulting in distortion of an image viewed on the screen. Matte surface treatments have been used to address this problem, but the application of typical matte surfaces over an optical screen reduces optical transmission.

SUMMARY

In one general aspect, a method of applying a protective film to a device includes providing a protective film comprising an adhesive layer covered by a backing. The adhesive layer is disposed on a first major surface of the protective film. The method further includes removing at least a portion of the backing to expose an adhesive area and contacting the exposed adhesive area to a surface portion of a portable electronic device. The method further includes applying a pressure to a second major surface of the protective film to press the exposed adhesive layer against the surface portion of the portable electronic device. The method may be performed without the application of any liquid to the device or the film.

In some embodiments, the adhesive layer comprises a pressure-sensitive adhesive. The pressure-sensitive adhesive may include a copolymer comprising an acrylate polymer and a silicone macromer. In some embodiments, the method includes diffusing air bubbles through the protective film.

The method may include applying the pressure with a smoothing device. In some embodiments, the pressure may be applied to an exposed surface of a cap sheet, the cap sheet disposed on the second major surface of the protective film. In some embodiments, after applying the pressure to the exposed surface of the cap sheet, the method includes removing the cap sheet to expose the second major surface of the protective film. In some embodiments, after the pressure is applied to the second major surface of the protective film, the method includes repositioning the protective film.

The contacting step may include holding the protective adhesive film by at least one tab extending from the film. In some embodiments, after holding the protective adhesive film by the at least one tab extending from the film, the method includes removing the at least one tab from the polyurethane sheet.

In another general aspect, an electronic device comprises a display surface and a protective film disposed on the display surface. An adhesive layer is disposed between and in contact with at least a portion of a first major surface of the protective film and the display surface. The protective film may adhere to the device without application of any liquid or solvent.

In some embodiments, the electronic device further includes a bezel that is aligned along each edge of the display and a housing having a plurality of corners and sides, wherein the display surface may be disposed on the housing. A second protective film may be disposed on each corner of the housing, and/or a third protective film may be disposed on the bezel. A second adhesive layer may be disposed between and in contact with at least a portion of a first major surface of the second protective film and each corner of the housing. A third adhesive layer may be disposed between and in contact with at least a portion of a first major surface of the third protective film and the bezel. In some embodiments, the second and third protective films adhere to the device without application of any liquid or solvent.

In some embodiments, the protective film comprises polyurethane. In some embodiments, at least a portion of a second major surface of the protective film may include a micro-matte surface structure. In some embodiments, no air bubbles are visible beneath the surface of the protective adhesive film. In some embodiments, the protective film is air permeable. The adhesive may include an acrylate polymer and a silicone macromer.

In yet another aspect, a protective adhesive film includes a polyurethane sheet and an adhesive layer disposed on at least a portion of a first major surface of the polyurethane sheet. The adhesive layer includes a pressure-sensitive adhesive that comprises a copolymer comprising an acrylate polymer and a silicone macromer. In some embodiments, the protective adhesive film is configured to adhere to a display of an electronic device without the application of any liquid to the adhesive layer or the device.

The polyurethane sheet may be between about 75 microns and about 400 microns in thickness. In some embodiments, the polyurethane sheet comprises a polycaprolactone-based aliphatic thermoplastic urethane. In some embodiments, at least a portion of a second major surface of the polyurethane sheet comprises a micro-matte surface structure. In some embodiments, the protective adhesive film includes at least one tab extending from the polyurethane sheet. In some embodiments, a cap sheet is disposed on a second major surface of the polyurethane sheet.

In some embodiments, the adhesive layer is between about 12 microns and about 75 microns in thickness. The adhesive may include a copolymer of the acrylate polymer and a silicone macromer side chain.

DETAILED DESCRIPTION

Figure 1:
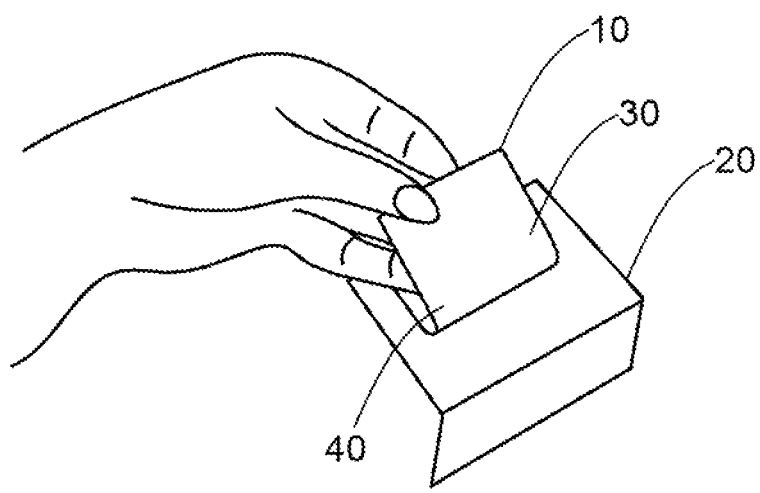
FIG. 1 illustrates an exemplary adhesive film and a step for applying an adhesive film to an electronic device.

As used in the description below and in the appended claims, the singular forms "a," "an," and "the" include plural references unless the context clearly dictates otherwise. Unless defined otherwise, all technical and scientific terms used in this document have the same meanings as commonly understood by one of ordinary skill in the art. As used in this document, the term "comprising" means "including, but not limited to." As used herein, the term "about," when referring to a value, means plus or minus 10% of the value.

This disclosure is not limited to the particular systems, devices and methods described, as these may vary. Also, the terminology used in this document is only for the purpose of describing particular versions or embodiments, and it is not intended to limit the scope.

Devices and methods are disclosed that avoid the need for an aqueous solution or other liquid in applying a protective adhesive film to an electronic device and removing trapped air bubbles. As described herein, a protective film comprising an adhesive layer (e.g., a pressure-sensitive adhesive layer) may be adhered to a device surface without the use of an aqueous solution to remove trapped air bubbles. Instead, trapped air bubbles are removed by applying pressure across the film surface to mechanically eliminate large (e.g., greater than 2-3 mm in diameter) air bubbles, while permitting smaller air bubbles to be eliminated over time. The adhesive film may be disposed on a first major surface of the protective adhesive film. As used in the document, the term "major surface" refers to a planar surface of a sheet or layer of a film. In general, a sheet will have two opposing major surfaces.

In some embodiments, a protective film may comprise a polyurethane sheet, e.g., a polycaprolactone-based aliphatic thermoplastic urethane sheet. A first major surface of a polyurethane sheet may be coated with one or more layers of a pressure-sensitive adhesive, such as a copolymer comprising an acrylate polymer and a silicone macromer. In some embodiments, the protective film is a polycaprolactone-based aliphatic thermoplastic urethane and comprises an adhesive layer consisting essentially of a copolymer of an acrylate polymer and silicone macromer side chains. A micro-matte surface structure may be formed on at least a second major surface of the sheet, as described herein. In another embodiment, a protective film may comprise a polyurethane sheet, e.g., a polycaprolactone-based aliphatic thermoplastic urethane sheet. The sheet may be coated on one side with a micro-matte layer, as described herein.

The protective adhesive film may comprise a polyurethane sheet, e.g., an aliphatic polyester urethane-based sheet, e.g., a polycaprolactone based aliphatic thermoplastic urethane sheet, coated on all or part of a first major surface (or "backed") with an adhesive layer. In some embodiments, the adhesive layer is a pressure-sensitive adhesive layer. The pressure-sensitive adhesive layer (or coating) may be a copolymer comprising an acrylate polymer and a silicone macromer. In some embodiments, an adhesive layer thickness may be about 10 to about 100 microns, about 12 to about 75 microns, about 25 to about 38 microns, about 30 microns, or about 35 microns. The pressure-sensitive adhesive layer (or coating) may comprise an acrylate-silicone copolymer based pressure-sensitive adhesive. The adhesive layer may comprise additional components, e.g., a tackifier or plasticizer, and may be a self-healing adhesive. The adhesive layer may be formed without the use of a cross-linker or photo-initiator. The adhesive layer may be prepared using a thermal cure process. In some embodiments, the adhesive layer is made of an adhesive that does not immediately firmly secure the film to a device and thus allows for slight repositionability of the film after placement on the device. For example, the adhesive layer may include an amount of silicone to permit repositionability. In some embodiments, unpolymerized silicone, tackifier, or other low molecular weight components are included in the adhesive layer and migrate into the polyurethane sheet and modify its characteristics. A polyurethane sheet comprising an adhesive layer may be made more flexible or more impact resistant by the interaction with one or more such components from an adhesive.

In some embodiments, the adhesive layer comprises a polyacrylate-based pressure-sensitive adhesive layer, having silicone macromer side chain modifications of one or more acrylate ester groups. In some embodiments, the adhesive layer may be prepared from or comprise acrylic acid, methacrylic acid, esters of acrylic acid comprising 4 to 21 carbon atoms, esters of methacrylic acid comprising 5 to 21 carbon atoms, acrylamide, substituted acrylamides such as N,N-dimethyl acrylamide, styrene, substituted styrenes such as vinyl toluene, acrylonitrile, methacrylonitrile, N-vinyl pyrrolidone, N-vinyl caprolactam, vinylidene chloride, vinyl esters of carboxylic acids, 2-(2-ethoxyethoxy)ethyl acrylate, 2-ethylhexyl acrylate, butyl acrylate, hydroxyethyl acrylate, hydroxypropyl acrylate, 2-carboxyethyl acrylate, ethoxyethyl acrylate, perfluorooctyl acrylate, isooctyl acrylate, divinylbenzene, vinylbenzyl chloride, vinyl acetate, glycidyl methacylate, hydroethyl acetate, hydroxypropyl acetate, glacial acrylic acid, methyl acrylate, ethyl acrylate, butyl acrylate, iso butyl acrylate or other acrylates, or combinations thereof. In some embodiments, the pressure-sensitive adhesive comprises acrylate and silicone in other polymer configurations as known in the art. Suitable pressure-sensitive adhesives may be manufactured by 3M Company of St. Paul, Minn. or other manufacturing companies.

The protective film may have a thickness from about 75 microns up to about 400 microns. For example, the protective adhesive films used may have thicknesses including about 75 microns, about 100 microns, about 150 microns, about 175 microns, about 200 microns, about 250 microns, about 300 microns, or about 350 microns. Different thicknesses may be used for different parts of a device. For example, an electronic device may use a 150 micron film for the device's optical screen and a 300 micron film for the device's body. Such films may provide scratch resistance, impact resistance, or both, and may provide higher impact resistance to the parts of the device that are most likely to need it, while preserving the sensitivity and/or clarity of portions of the device that are less likely to require impact resistance.

The protective adhesive film to be adhered to a device optical screen may have a shore hardness of between about 85 A and 99 A, or between about 50 D and 75 D to provide a strong film with a flat surface with minimal or no surface distortion (e.g., "orange peel"). In some embodiments, the shore hardness of the protective adhesive film is about 60 D or about 93 A. The protective adhesive film may allow for proper optical transmission and may provide a substantially smooth surface so that it best mirrors the glass surface on the device. In addition to providing an aesthetic benefit, this allows for minimal or no reduction in sensitivity and/or connectivity for touch screens.

The device body films may have a variety of surface types, including anti-glare, glossy, or matte, and may be optically transparent, transparent with a matte texture, translucent or opaque. The film may comprise UV absorbers. The films may be colored or uncolored. In some embodiments, the protective adhesive film may comprise a surface having a micro-matte structure. Surface treatments may vary over a single device, i.e., a film covering an optical screen may have an anti-glare surface while film covering a device body may have a matte surface. A portion of a protective film to be adhered to the body of a device (portions not including the optical screen), the optical screen, or both may have a matte and/or a micro-matte finish or layer which may eliminate or reduce fingerprints and adds additional "grip" to the device. Suitable protective films may be manufactured by Argotec Inc. of Greenfield, Mass., or other similar manufacturing companies. In some embodiments, the adhesive coating or layer may be protected by a removable backing (e.g., prior to adhering the protective film to a device) before the protective adhesive film is adhered to a device surface.

A micro-matte surface structure is one that has a matte finish with an average roughness, Ra, between about 0.08 µm and about 0.22 µm, or about 0.17 µm, or about 0.135 µm. In some embodiments, a micro-matte surface structure has an average maximum height, Rz, between about 0.50 µm and about 1.20 µm, or about 1.11 µm, or about 1.23 µm. A micro-matte surface structure may have an average depth, Rmax, between about 1.30 µm and about 1.50 µm, or about 1.40 µm.

In some embodiments, a micro-matte protective film is prepared by extrusion of a urethane resin onto a micro-matte textured casting sheet which, in some embodiments, may be a PET multi-layer film. The urethane resin forms a film that, when removed from the casting sheet, retains a micro-matte surface texture on one side (e.g., a second major surface of the protective film) that mirrors the texture of the casting sheet. Thus, a film may be prepared by a single casting of urethane, rather than by addition of a micro-matte layer to a smooth urethane film. Alternatively, a micro-matte protective film may be prepared as a co-extrusion of at least two layers. Accordingly, a micro-matte protective film may be prepared using multiple resins of varying hardness such that its micro-matte structure may be harder and/or more durable as may be required for specific applications. Alternatively, a micro-matte layer may be formed on a polyurethane sheet, for example, by extruding a resin onto a urethane film and contacting the resin with a micro-matte casting sheet to form a micro-matte surface texture. The micro-matte protective film may comprise a pressure-sensitive adhesive layer or layers, which may be the same or similar to the pressure-sensitive adhesive layer or layers described above. In some embodiments, the micro-matte textured casting sheet is the same or different than the cap sheet described herein. The micro-matte structure may cover all or part of a second major surface of a protective film.

In some embodiments, a polyurethane sheet coated with a pressure-sensitive adhesive (e.g., to create a protective adhesive film) may be cut into predetermined shapes designed to fit particular portions of digital electronic devices including, but not limited to, mobile telephones, personal digital assistants, eReaders, computer notebooks, netbooks, tablets, cameras, game consoles, iPods and other MP3 players, navigation devices, and GPS devices. Such devices typically have a display screen and a housing. The cut film pieces of the protective adhesive film may be applied to the screen and/or other portions of the digital device (such as an edge, side, corner or other portion of the housing, and/or the bezel) to protect it from damage, using methods described in this document. In some embodiments, the film may be applied to corners, edges and/or sides of the device to provide a shock-absorbing, impact-resistant skin for the device. The cut film pieces may be designed such that they contain openings to correspond to various device components and thus do not block input or output ports, connections, jacks, or entry points for access to internal components of the device. The cut film may be flexible, to permit its application onto curved surfaces smoothly without the appearance of gaps, wrinkles, or air bubbles.

In some embodiments, the protective adhesive film includes a cap sheet (e.g., a casting film and/or a casting sheet). The cap sheet may be disposed on a second major surface of the protective film. The cap sheet may be formed out of a material(s) that is sufficiently rigid that the pressure applied by a mechanical smoothing device (e.g., a squeegee) does not cause the cap sheet or the protective film to deform (e.g., "orange peel"). Further, the cap sheet may withstand an increased pressure from the mechanical smoothing device, which may result in reduced air bubbles between the protective film and an electronic device. Additionally, the cap sheet may protect the second major surface of the protective film during manufacture, transport, and/or the end-user installation processes. This may provide an advantage over secondary application/release tapes that include a cured liquid for top coating (e.g., a polyurethane and/or an acrylic material). The secondary application/release tapes include an adhesive that may roughen or distort the second major surface of the pressure adhesive layer, which may reduce the optical clarity of the protective film.

The cap sheet may be formed out of polyester. A polyester cap sheet (e.g., a laminating roll) that is about 2 mils thick may have sufficient rigidity and flexibility to prevent the cap sheet and/or the protective film from deforming. Additionally, polyester may withstand the extrusion temperature of the protective film (e.g., about 320-350° F.). The cap sheet may comprise polyester, polypropylene, nylon, polyimide, and similar high-temperature resistant (e.g., able to resist the temperature of the protective film extrusion, such as about 320-350° F.) and/or high melt point films e.g., a melt point greater than the temperature of the protective film extrusion, such as about 320-350° F.). The cap sheet may be from about 0.92 mils (i.e., about 24 microns) to about 10 mils thick (i.e., about 254 microns). In some embodiments, the cap sheet may be about 2 mils (i.e., about 24 microns) thick. The cap sheet may be embossed, brushed, or flat. In some embodiments, a micromane surface structure is defined in a cap sheet.

Suitable materials for the cap sheet and protective film may include one or more of the following materials (or similar materials) manufactured by Argotec, Inc. of Greenfield, Mass. (or other polyurethane manufacturing companies): ARGOTHANE® aromatic polyethers/thermoplastic polyurethane (part numbers 17103, 17200, 18103, 18212, 18214, 18215, 18233, 18235, 18242, 18247, 18248, 18305, 18411, 18422, 18433, 18450-FR, 18452-FR), ARGOTHANE® aromatic polyesters/thermoplastic polyurethane (part numbers 19102, 19103, 19205, 19422, 19424, 19426, D7101, 27303, 27370, 28304, 29100, 29102, 29213, 29222, 29285, and/or 29300), ARGOTHANE® aliphatic polyesters (part numbers 3751 and/or AGKR), ARGOTHANE® aliphatic polycaprolactones/thermoplastic polyurethane (part number 46510) ARGOTHANE® waterproof breathable films/thermoplastic polyurethane (part numbers TX1540 and/or TX2060), ARGOFLEX® waterproof-breathable films/thermoplastic polyurethane (part numbers TX 1300, TX 1500, and/or TX2000), and/or ARGOTEC® film no. 49522.

In some embodiments, at least a portion of a surface of the cap sheet (e.g., a casting film and/or a casting sheet) has a texture (e.g., brushed, ribs, ridges, grooves, raised dots, etc). The textured surface of the cap sheet may be disposed on the second major surface of the protective film. The textured surface may cause micro air pockets to form between the textured surface and the second major surface of the protective film. The micro air pockets are small air pockets that form in gaps between the textured surface and the second major surface of the protective film. The micro air pockets may allow the cap sheet to be more easily removed from the pressure-sensitive adhesive layer (e.g., by reducing a seal caused by two substantially smooth surfaces). In the alternative, the second major surface of the protective film may include a textured surface. However, this may decrease the optical clarity of the protective film and, therefore, may be less desirable to the end user. In some embodiments, the cap sheet has a texture that defines a micro-matte surface on the second major surface of the protective film.

A mechanical smoothing device may be used to apply a pressure to an exposed surface of the cap sheet. The cap sheet may allow for the use of a wider and/or more rigid mechanical smoothing device during the installation process as a result of the rigidity of the cap sheet. For example, the mechanical smoothing device may have approximately the same width as the entire electronic device (e.g., eReader, computer notebook, tablet, etc.) or a portion of the electronic device (such as a display screen) to which the protective adhesive layer is to be applied. Additionally, the cap sheet may be sufficiently rigid to withstand the pressure applied by the mechanical smoothing device to minimize resulting damage (e.g., distortion) to the protective adhesive film. The smoothing device may be formed from a variety of materials, including a thick, heavy gauge paper (e.g., greater than about 50 mils thick, between about 50-150 mils thick, between about 50-90 mils thick, between about 50-80 mils thick, between about 60-80 mils thick, or about 70 mils thick), polyvinyl chloride acetate (PVCA), unplasticized polyvinyl chloride (uPVC), silicone rubber, ethylene propylene diene monomer (M-class) rubber (EPDM rubber), and/or other semi-rigid rubbers, and/or rigid plastics, such as rigid polyethylene (e.g., HDPE, MDPE, or LDPE), polyvinyl chloride (PVC), and/or polypropylene. For example, the smoothing device may be formed from silicone rubber and/or EPDM rubber that is about 60 to 90 Shore A durometer in hardness.

A wider mechanical smoothing device may provide several advantages. For example, a wider mechanical smoothing device only needs to be applied once (as it may be about the same width as a screen of an eReader, etc.), thereby decreasing installation time. Additionally, a wider mechanical smoothing device may minimize unintended skewing, repositioning and/or stretching of the protective adhesive film that may occur as a result of multiple squeegee applications (e.g., in different directions with respect to the screen of an eReader, etc.). A wider and harder mechanical smoothing device allows the user to apply an increased downward force/pressure on the cap sheet, resulting in an increased adherence of the protective adhesive film to the electronic device and/or reduced air bubbles between the protective adhesive film and the electronic device.

In some embodiments, the protective film includes a body and at least one tab that extends outwardly from the body. In some embodiments, the protective film includes two tabs, for example, on opposing sides of the protective film. The tabs may be positioned in the middle of each opposing side, or in any other position along the edge of the protective film. The tabs may function as grab handles to allow a user to more accurately position the protective adhesive film and cap sheet on the electronic device and/or to reduce fingerprints on the protective adhesive film. In some embodiments, the tabs include perforations, allowing the user to more easily remove the tabs after installation.

FIG. 1 illustrates an exemplary first step for applying an adhesive film (e.g., a protective adhesive film and/or a micro-matte protective film) to an electronic device. In this step, a portion of a backing layer 20 is removed from an adhesive film 10 to expose an adhesive area 30. The adhesive area 30 is disposed on at least a portion of a first major surface 40 of the protective adhesive film 10. Prior to removing the backing layer 20, the adhesive film 10 may be modified by cutting (e.g., by die cutting, plotter cutting, or other methods) to create segments matched in size and shape to chosen surface areas on a particular device to be protected. Alternatively, the adhesive film 10 may be pre-cut to match a desired area on an electronic device.

Figure 2:
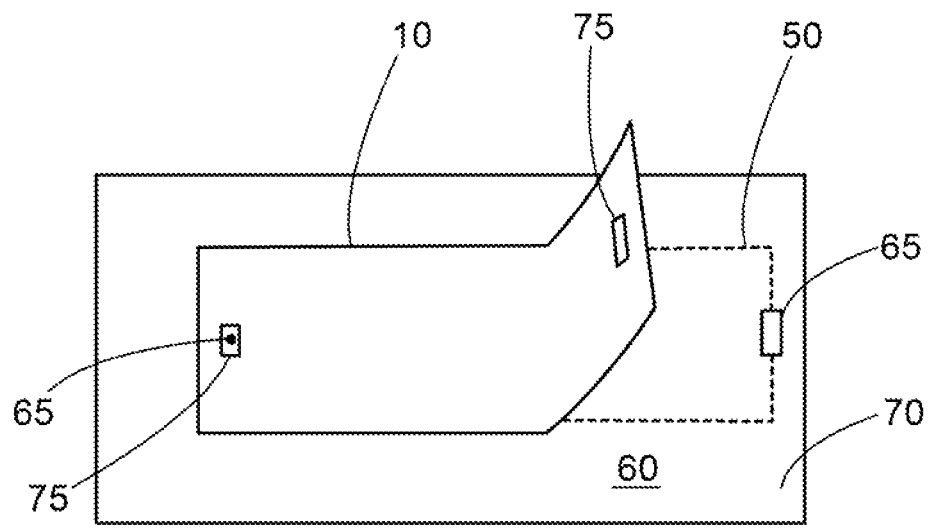
FIG. 2 illustrates an exemplary additional step for applying an adhesive film to an electronic device.

Referring to FIG. 2, after the backing layer 20 is partially or fully removed, the adhesive area 30 may be positioned to contact and align with an exposed surface portion 50 of an electronic device 60 (e.g., a display surface). In some embodiments, the exposed surface portion 50 may be a small, large, or an entire portion of an exposed surface 70 of the electronic device 60. In some embodiments, the adhesive film 10 and/or the adhesive area 30 are aligned to the electronic device 60 (e.g., aligned to the surface portion 50, e.g., an edge of the exposed surface 70). For example, openings 75 in the adhesive film 10 may be aligned to corresponding components 65 (e.g., input and/or output ports, buttons, etc.) of the electronic device 60. In some embodiments, prior to contacting the adhesive film 10 to the electronic device 60, at least a portion of the exposed surface 70 of the electronic device may be cleaned, for example, by rubbing or polishing the at least a portion of exposed surface 70 with a dry tissue or towelette.

The film 10 (e.g., a protective adhesive film and/or a micro-matte protective film) may be applied to the electronic device 60 "as is." There is no need to apply any liquid or other additive to any portion of the exposed surface 70 or the adhesive area 30 at any time during the process.

Figure 3:
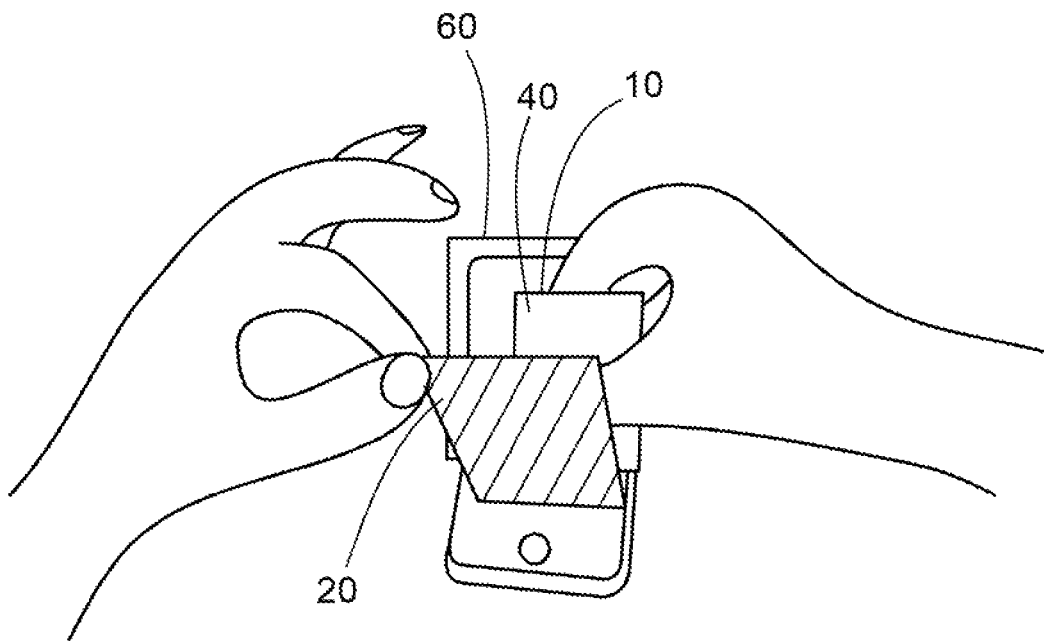
FIG. 3 illustrates an exemplary additional step for applying an adhesive film to an electronic device.

As illustrated in FIG. 3, after the film 10 is aligned to the device 60, the backing layer 20 is completely removed from the first major surface 40 of the film 10, and the remaining adhesive area 30 of the film 10 is aligned to contact the device 60.

Figure 4:
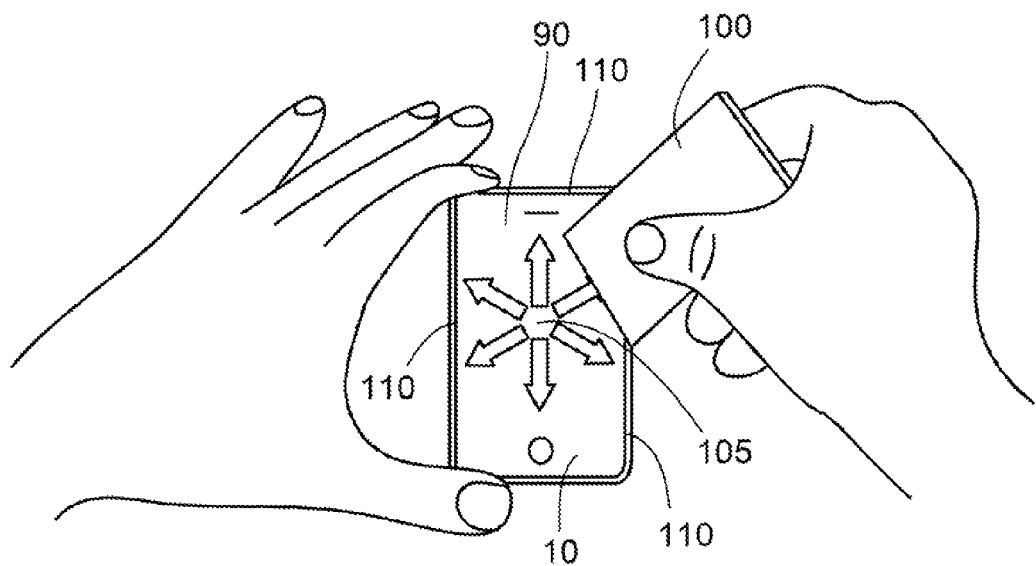
FIG. 4 illustrates an exemplary additional step for applying an adhesive film to an electronic device.

Referring to FIG. 4, a mechanical smoothing device 100 (e.g., a squeegee, a device having a resilient edge, or a hand) may be used to apply a pressure to the second major surface 90 of the film 10. The pressure may cause the adhesive area 30 to press against the exposed surface portion 50 of the electronic device 20. In some embodiments, the mechanical smoothing device 100 applies the pressure from a central area 105 to an edge 110 of the second major surface 90 continuing in different radial directions from the central area 105 across the second major surface 90. In some embodiments, the mechanical smoothing device 100 applies the pressure starting at or near a trapped air pocket or an air bubble and continues to an edge 110. Any haze or remaining trapped air bubbles, if less than about 2-3 mm in diameter, may be left to diffuse out through the protective adhesive film 10 (e.g., an air-permeable film), generally disappearing within 24 hours.

In some embodiments, the method may include repositioning the film 10 (e.g., a protective adhesive film and/or a micro-matte protective film) after it has been adhered to the exposed surface portion 50 of the device 20. For example, the method may include lifting a portion of the film 10 away from the exposed surface portion 50 of the device 20 and reapplying (e.g., re-contacting) the portion to the exposed surface portion 50 of the device 20, which may be helpful in repositioning and/or re-aligning the film 10 and/or in removing air bubbles. In some embodiments, additional mechanical smoothing (e.g., by hand or with a mechanical device) may be used to ensure that the film 10 is adhered to the edges 110 of the device 20.

Figure 5:
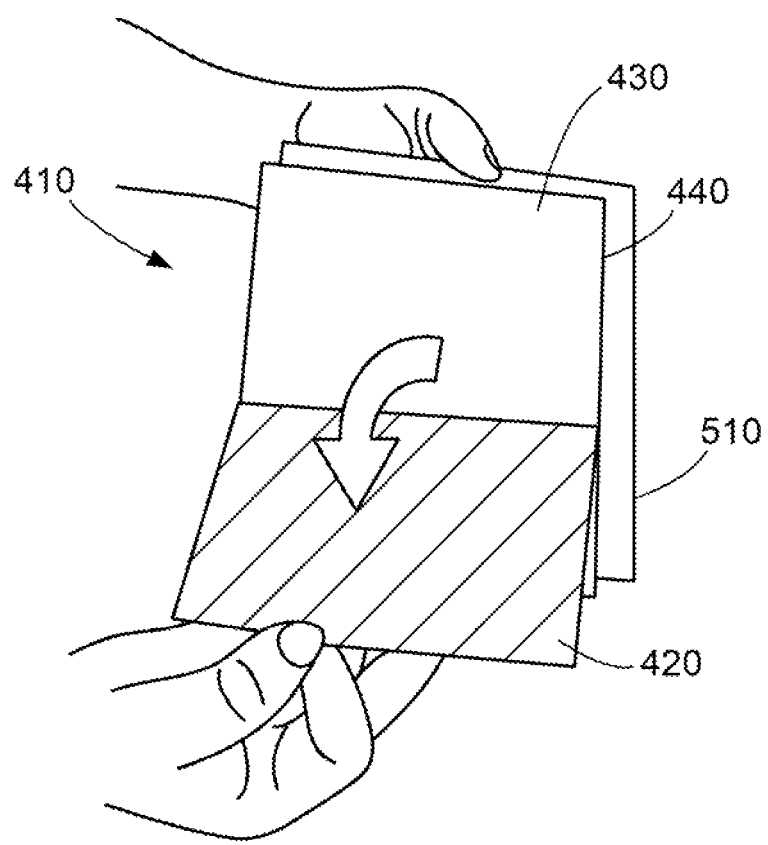
FIG. 5 illustrates an exemplary step for applying a protective adhesive film that includes a cap sheet layer to an electronic device.

FIGS. 5-8 illustrate an alternative procedure that may be used for larger electronic devices, such as tablets, notebooks, and notebooks. In this embodiment, the protective adhesive film includes a cap sheet layer (e.g., a casting film and/or a casting sheet). Referring to FIG. 5, a portion of a backing layer 420 is removed from an adhesive film 410 to expose an adhesive area 430. In some embodiments, the adhesive film 410 is a micro-matte protective adhesive film. The adhesive area 430 is disposed on at least a portion of a first major surface 440 of the protective adhesive film 410. A cap sheet 510 is disposed on a second major surface of the protective adhesive film 410. Prior to removing the backing layer 420, the film 410, together with the cap sheet 510 as one piece or separately from the cap sheet 510, may be shaped by cutting (e.g., by die cutting, plotter cutting, or other methods) to create segments, with a cap sheet 510 layered on the adhesive film 410, matched in size and shape to chosen surface areas on a particular device to be protected. Alternatively, the protective adhesive film 410 and cap sheet 510 may be pre-cut to match a desired area on an electronic device.

Figure 6:
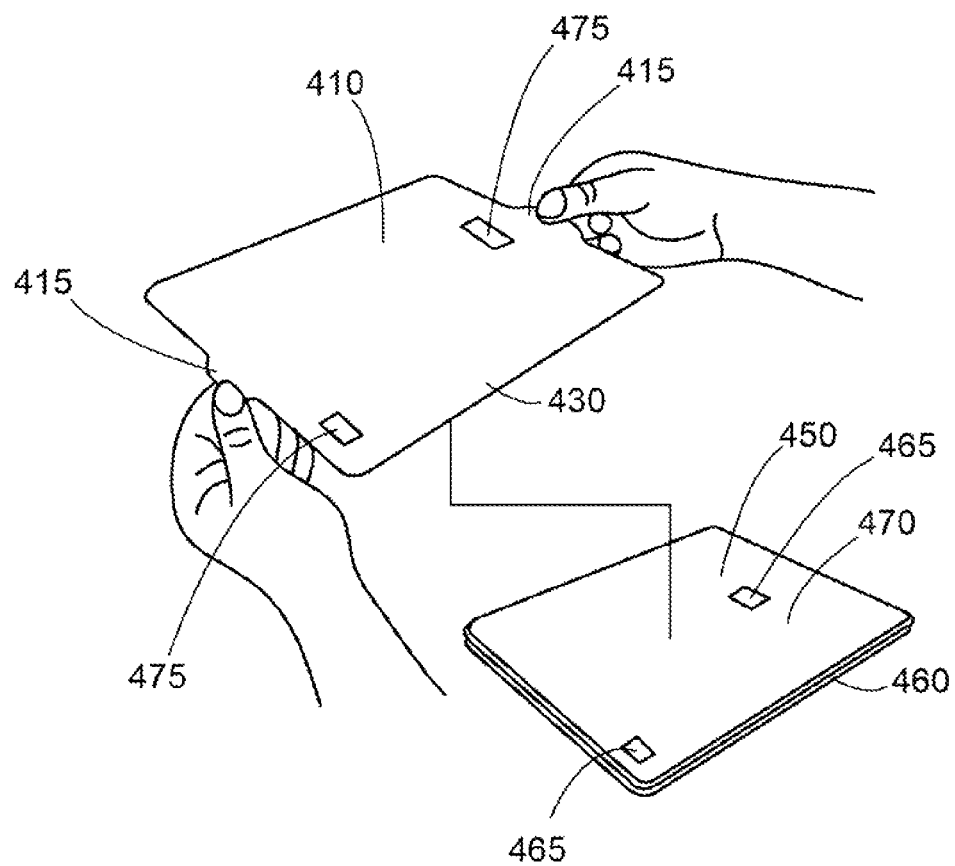
FIG. 6 an exemplary additional step for applying a protective adhesive film that includes a cap sheet layer to an electronic device.

After the adhesive is exposed, FIG. 6 illustrates that the adhesive area 430 may be contacted to an exposed surface portion 450 of an electronic device 460 (e.g., a display surface). In some embodiments, the exposed surface portion 450 may be any portion of exposed surface 470 including the entire exposed surface 470. In some embodiments, the adhesive film 410 and/or the adhesive area 430 may be positioned to contact and align with an exposed surface portion 450 of the electronic device 460. For example, openings 475 in the adhesive film 410 may be aligned to corresponding components 465 (e.g., input and/or output ports, buttons, etc.) of the electronic device 460. In some embodiments, at least one optional tab 415 extends from the adhesive film 410. A user may hold the at least one optional tab 415 while positioning, contacting, and/or aligning the adhesive area 430 to the exposed surface portion 450 of the electronic device 460. In some embodiments, prior to contacting the adhesive film 410 to the electronic device 460, at least a portion of exposed surface 470 of the electronic device may be cleaned, for example, by rubbing or polishing the at least a portion of exposed surface 470 with a dry tissue or towelette. In some embodiments, no liquid or other additive is applied to the adhesive film 410, the adhesive area 430, and/or the electronic device 460.

Figure 7:
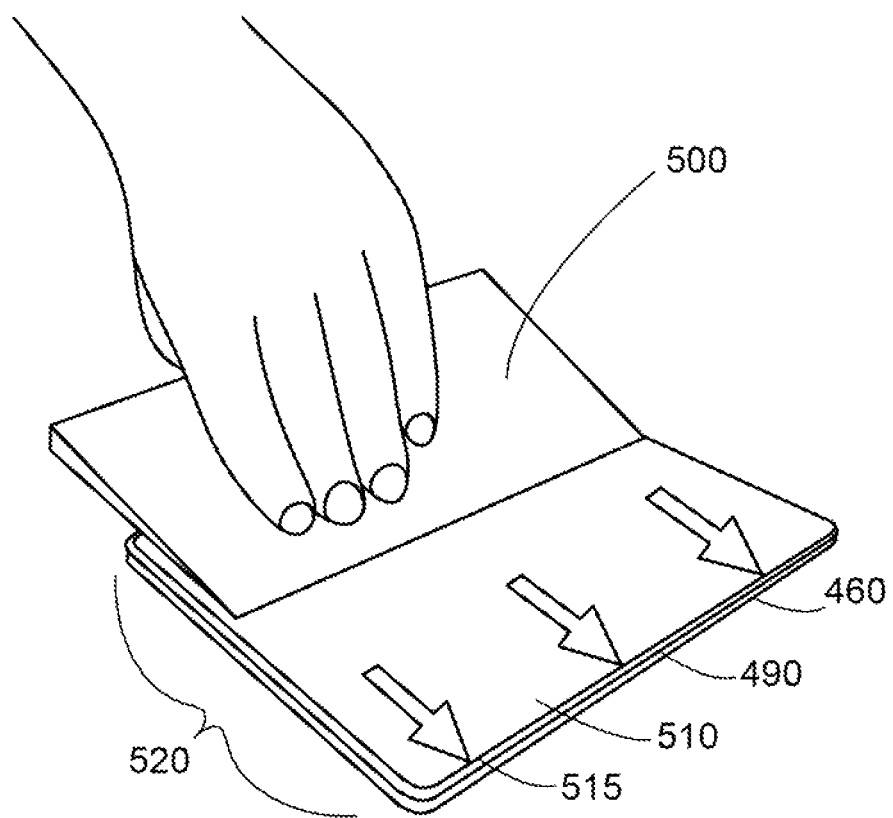
FIG. 7 illustrates an exemplary additional step for applying a protective adhesive film that includes a cap sheet layer to an electronic device.
Figure 8:
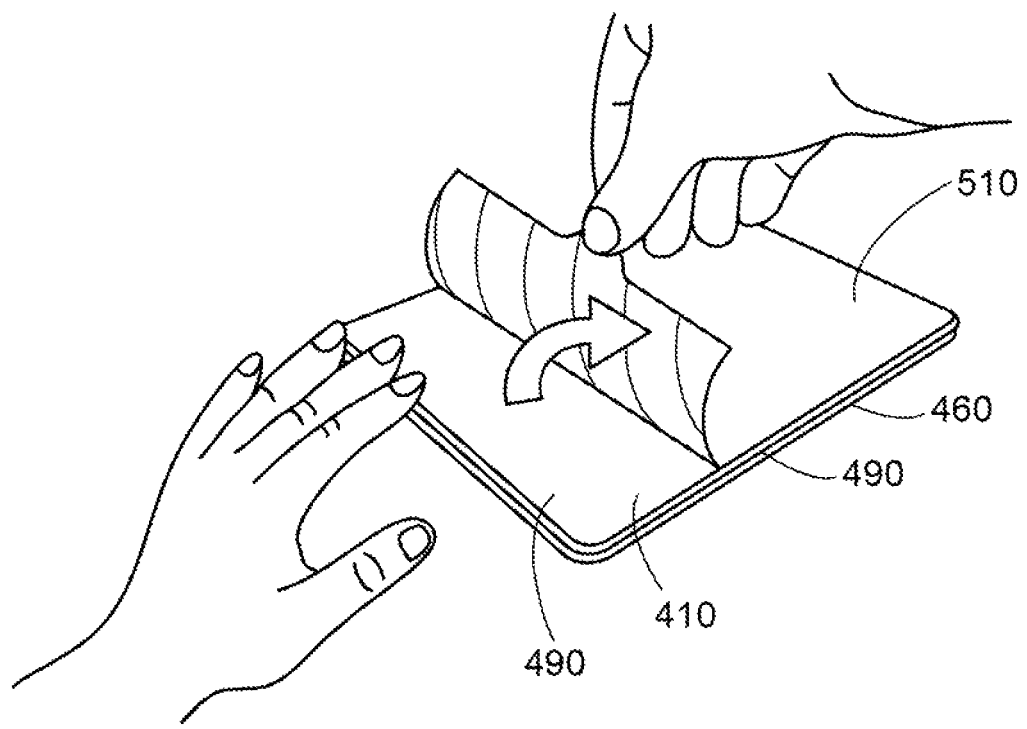
FIG. 8 illustrates an exemplary additional step for applying a protective adhesive film that includes a cap sheet layer to an electronic device.

Referring to FIG. 7, a mechanical smoothing device 500 (e.g., a squeegee, oversized squeegee, a device having a resilient edge, or a hand) may be used to apply a pressure to the cap sheet 510 disposed on a second major surface 490 of the film 410. The pressure may causes the adhesive area 430 to press against the exposed surface portion 450 of the electronic device 460 (as depicted in FIG. 6). The mechanical smoothing device 500 may be applied starting at an edge 515 of the electronic device 420 and proceeding across the width 520 of the electronic device 420. An optional second mechanical smoothing step may be applied in the opposite direction of the first mechanical smoothing step. After pressure is applied with the mechanical smoothing device 500, the cap sheet 510 is removed (e.g., peeled off) to expose the second major surface 490 of the film 410, as illustrated in FIG. 8. Any haze or remaining trapped air bubbles, if less than about 2-3 mm in diameter, may be left to diffuse out through the protective adhesive film 410 (e.g., an air-permeable film), generally disappearing within 24 hours. For example, air bubbles may diffuse into the first major surface 440 of the film 410 and out the second major surface 490 of the film 410. In some embodiments, after the mechanical smoothing step, the optional hold tabs 415 may be removed from the film 410 by pulling along optional perforations (not shown) or by cutting off the hold tabs 415.

The method improves the adherence of the film to the surface of the device, and provides a higher quality (e.g., less damaged, more transparent, and/or more accurately placed) protective film. The method further reduces the number of remaining trapped air bubbles. The method further reduces the installation time of applying a protective film to an electronic device.

What is claimed is:

1. A method of applying a protective film to a portable electronic device, the method comprising:
    providing protective film product comprising:
        a protective film having a first major surface and a second major surface opposite the first major surface;
        an adhesive layer disposed on the first major surface of the protective film, the adhesive layer comprising an adhesive that provides tack sufficient to securely adhere the protective film to a surface portion of the portable electronic device without addition of a liquid during installation of the protective film;
        a backing layer that covers the adhesive layer to protect the adhesive layer prior to installation of the protective film onto the surface portion of the portable electronic device, the backing layer being removable to expose the adhesive layer to the surface portion of the portable electronic device during the installation of the protective film onto the surface portion of the portable electronic device;
        a removable cap sheet disposed on the second major surface of the protective film; wherein micro air pockets are formed in gaps between a textured surface of said cap sheet and said second major surface of said protective film;
        a first tab extending outward at a first edge of the protective film and a second tab extending outward at a second edge of the protective film, wherein the first edge is opposite the second edge, the first tab and the second tab each being sized to form grab handle to allow a user to position the first major surface of the protective film during installation of the protective film onto the surface portion of the portable electronic device; and
        first and second sets of perforations, the first set of perforations removably dividing the first tab from at least one of the protective film and the removable cap sheet, and the second set of perforations removably dividing the second tab from at least one of the protective film and the removable cap sheet, the first set of perforations allowing removal of the first tab after positioning and installation of the protective film onto the surface portion of the portable electronic device, and the second set of perforations allowing removal of the second tab after positioning and installation of the protective film onto the surface portion of the portable electronic device;
    holding the protective film product by at least one of the first and second tabs;
    peeling the backing layer of the protective film;
    positioning the protective film to align with the surface portion of the portable electronic device via manipulation of at least one of the first tab and the second tab of the protective film product;
    contacting an adhesive area of the adhesive layer, exposed by the peeling of the backing layer, to the surface portion of the portable electronic device;
    applying pressure to an outer surface of the removable cap sheet with a mechanical smoothing device to press the exposed adhesive area of the adhesive layer against the surface portion of the portable electronic device, and continuing to apply pressure such that a given target area of the surface portion of the portable electronic device is adhesively covered by the protective film;
    forcing at least air bubbles larger than about 2-3 mm in diameter that are trapped between the adhesive layer and the surface portion of the portable electronic device to the first, second, or another edge of the protective film by applying pressure with the mechanical smoothing device to the outer surface of the removable cap sheet, wherein the removable cap sheet is formed from a rigid material;
    removing the removable cap sheet from the protective film to expose the second major surface of the protective film, wherein removing the removable cap sheet from the protective film does not reduce the optical clarity of the protective film; and
    allowing remaining air bubbles less than about 2-3 mm in diameter that are trapped between the adhesive layer and the surface portion of the portable electronic device to diffuse through the adhesive layer and the protective film.

2. The method according to claim 1, wherein the protective film is transparent.

3. The method according to claim 1, wherein the first and second tabs are connected to the protective film respectively at the first and second edges of the protective film, and wherein the method further comprises removing the first tab from the protective film by tearing the first tab at the first set of perforations, and removing the second tab from the protective film by tearing the second tab at the second set of perforations.

4. The method according to claim 1, further comprising, after the contacting of the exposed adhesive area to the surface portion of the portable electronic device, repositioning the protective film in relation to the surface portion of the portable electronic device.

5. The method according to claim 1, wherein low molecular weight components are included in the adhesive layer, and wherein the low molecular weight components migrate into the protective film and modify the characteristics of the protective film.

6. The method according to claim 5, wherein the low molecular weight components migrate into the protective film and modify the characteristics of the protective film to make the protective film more impact resistant.

7. The method according to claim 5, wherein the low molecular weight components migrate into the protective film and modify the characteristics of the protective film to make the protective film more flexible.

8. The method according to claim 5, wherein the low molecular weight components comprise a tackifier.

9. The method according to claim 1, wherein the adhesive layer comprises silicone.

10. The method according to claim 9, wherein the silicone is unpolymerized.

11. The method according to claim 1, wherein the protective film has a thickness from about 75 microns up to about 400 microns.

12. The method according to claim 1, wherein the protective film has a thickness being one of about 75 microns, about 100 microns, about 150 microns, about 175 microns, about 200 microns, about 250 microns, about 300 microns, and about 350 microns.

13. The method according to claim 1, wherein the protective film comprises a polyurethane sheet.

14. The method according to claim 1, wherein the protective film comprises a polycaprolactone-based aliphatic thermoplastic urethane sheet.

15. The method according to claim 1, wherein the adhesive layer comprises a dry pressure sensitive adhesive.

16. The method according to claim 1, wherein the adhesive layer consists essentially of a copolymer of an acrylate polymer and silicone macromer side chains.

17. The method according to claim 1, wherein the protective film comprises a urethane sheet.

18. A method of protecting a portable electronic device, the method comprising:
   providing a protective film product comprising:
      a protective film having a first major surface and a second major surface opposite the first major surface, the first major surface and the second major surface being defined by a perimeter, the protective film being air permeable to permit diffusion of gases,
      an adhesive layer disposed on the first major surface of the protective film, the adhesive layer comprising an adhesive that provides tack sufficient to securely adhere the protective film to a surface portion of the portable electronic device without addition of a liquid during installation of the protective film,
      a backing layer that covers the adhesive layer to protect the adhesive layer prior to installation of the protective film onto the surface portion of the portable electronic device, the backing layer being removable to expose the adhesive layer to the surface portion of the portable electronic device during the installation of the protective film onto the surface portion of the portable electronic device,
      a removable cap sheet disposed on the second major surface of the protective film; wherein micro air pockets are formed in gaps between a textured surface of said cap sheet and said second major surface of said protective film, and
      a first tab extending outward near a first edge of the protective film and a second tab extending outward near a second edge of the protective film opposite the first edge, the first tab and the second tab each being sized to form a grab handle to allow a user to position the first major surface of the protective film during installation of the protective film onto the surface portion of the portable electronic device, the first tab and the second tab being removable from the protective film product;
   removing the backing layer from the adhesive layer of the protective film;
   positioning the protective film relative to the portable electronic device via manipulation of at least one of the first and second tabs to align the protective film to the surface portion;
   contacting, by an adhesive area of the adhesive layer, the protective film to the surface portion of the portable electronic device, the adhesive area corresponding to the removed backing layer;
   applying pressure on the removable cap sheet of the protective film when contacting the surface portion of the portable electronic device by the adhesive area of the adhesive layer, such that the adhesive area of the protective film is adhered to the surface portion of the portable electronic device; and
   removing air bubbles trapped between the adhesive layer and the surface portion of the portable electronic device, in which air bubbles exceeding approximately 2 mm are removed by pressure applied on the removable cap sheet toward the perimeter of the protective film, the remaining air bubbles being diffused through the protective film within a predetermined time.

19. The method according to claim 18, wherein the protective film product further comprises a mechanical smoothing device having a smoothing surface for smoothing the protective film; and
   the applying pressure on the removable cap sheet includes applying the smoothing surface of the mechanical smoothing device against the removable cap sheet of the protective film; and
   the removing air bubbles trapped between the adhesive layer and the surface portion of the portable electronic device includes applying lateral movement of the mechanical smoothing device on the removable cap sheet toward the perimeter of the protective film.

20. The method according to claim 18, further comprising:
   removing the first tab and the second tab from the protective film product by tearing the first tab at a first set of perforations and tearing the second tab at a second sets of perforations,
   wherein the first set of perforations removably divides the first tab from at least one of the protective film and the cap sheet, and the second set of perforations removably divides the second tab from at least one of the protective film and the removable cap sheet, the first set of perforations allowing removal of the first tab after positioning and installation of the protective film onto the surface portion of the portable electronic device, and the second set of perforations allowing removal of the second tab after positioning and installation of the protective film onto the surface portion of the portable electronic device.

21. The method according to claim 18, wherein the method is performed without the application of any liquid to at least one of the surface portion of the portable electronic device and the protective film.

22. The method according to claim 18, further comprising, after the contacting of the exposed adhesive area to the surface portion of the portable electronic device,
   repositioning the protective film in relation to the surface portion of the portable electronic device via manipulation of at least one of the first and second tabs to re-align the protective film to the surface portion of the portable electronic device.

23. The method according to claim 18, wherein low molecular weight components are included in the adhesive layer, and wherein the low molecular weight components migrate into the protective film and modify the characteristics of the protective film.

24. The method according to claim 23, wherein the low molecular weight components migrate into the protective film and modify the characteristics of the protective film to make the protective film at least one of more impact resistant and more flexible.

25. The method according to claim 23, wherein the low molecular weight components comprise a tackifier.

26. The method according to claim 18, wherein the protective film comprises a urethane sheet.

27. The method according to claim 18, wherein the adhesive layer comprises a dry pressure sensitive adhesive.

28. A method of applying a protective film to a portable electronic device, the method comprising:
providing protective film product comprising:
a protective film having a first major surface and a second major surface opposite the first major surface,
an adhesive layer disposed on the first major surface of the protective film, the adhesive layer comprising an adhesive that provides tack sufficient to securely adhere the protective film to a surface portion of the portable electronic device without the necessity of a liquid during installation of the protective film and further allows one or more of positioning and repositioning during said installation,
a backing layer that covers the adhesive layer to protect the adhesive layer prior to installation of the protective film onto the surface portion of the portable electronic device, the backing layer being removable to expose the adhesive layer to the surface portion of the portable electronic device during the installation of the protective film onto the surface portion of the portable electronic device,
a removable cap sheet disposed on the second major surface of the protective film; wherein micro air pockets are formed in gaps between a textured surface of said cap sheet and said second major surface of said protective film,
a first tab extending outward at a first edge of the protective film and a second tab extending outward at a second edge of the protective film, wherein the first edge is opposite the second edge, the first tab and the second tab each being sized to form a grab handle to allow a user to perform one or more of positioning or repositioning of the first major surface of the protective film during installation of the protective film onto the surface portion of the portable electronic device, and
first and second sets of perforations, the first set of perforations removably dividing the first tab from at least one of the protective film and the removable cap sheet, and the second set of perforations removably dividing the second tab from at least one of the protective film and the removable cap sheet, the first set of perforations allowing removal of the first tab after positioning and installation of the protective film onto the surface portion of the portable electronic device, and the second set of perforations allowing removal of the second tab after positioning and installation of the protective film onto the surface portion of the portable electronic device;
holding the protective film product by at least one of the first and second tabs;
peeling the backing layer off of the adhesive layer of the protective film;
performing one or more of positioning and repositioning of the protective film to align with the surface portion of the portable electronic device via manipulation of at least one of the first tab and the second tab of the protective film product;
contacting an adhesive area of the adhesive layer, exposed by the peeling of the backing layer, to the surface portion of the portable electronic device;
applying pressure to an outer surface of the removable cap sheet to press the exposed adhesive area of the adhesive layer against the surface portion of the portable electronic device, and continuing to apply pressure such that a given target area of the surface portion of the portable electronic device is adhesively covered by the protective film;
forcing air bubbles that are trapped between the adhesive layer and the surface portion of the portable electronic device to the first, second, or another edge of the protective film by applying pressure to the outer surface of the removable cap sheet, wherein the removable cap sheet is formed from a rigid material;
removing the removable cap sheet from the protective film to expose the second major surface of the protective film, wherein removing the removable cap sheet from the protective film does not reduce the optical clarity of the protective film; and
allowing any remaining air bubbles that are trapped between the adhesive layer and the surface portion of the portable electronic device to diffuse through the adhesive layer and the protective film.

29. The method according to claim 28, further comprising:
removing the first tab and the second tab from the protective film product by tearing the first tab at the first set of perforations and tearing the second tab at the second set of perforations,
wherein the first set of perforations removably divides the first tab from at least one of the protective film and the cap sheet, and the second set of perforations removably divides the second tab from at least one of the protective film and the removable cap sheet, the first set of perforations allowing removal of the first tab after positioning and installation of the protective film onto the surface portion of the portable electronic device, and the second set of perforations allowing removal of the second tab after positioning and installation of the protective film onto the surface portion of the portable electronic device.

30. The method according to claim 28, wherein the method is performed without the application of any liquid to at least one of the surface portion of the portable electronic device and the protective film.

31. The method according to claim 28, further comprising, after the contacting of the exposed adhesive area to the surface portion of the portable electronic device,
repositioning the protective film in relation to the surface portion of the portable electronic device via manipulation of at least one of the first and second tabs to re-align the protective film to the surface portion of the portable electronic device.

32. The method according to claim 28, wherein low molecular weight components are included in the adhesive layer, and wherein the low molecular weight components migrate into the protective film and modify the characteristics of the protective film.

33. The method according to claim 32, wherein the low molecular weight components migrate into the protective film and modify the characteristics of the protective film to make the protective film at least one of more impact resistant and more flexible.

34. The method according to claim 32, wherein the low molecular weight components comprise a tackifier.

35. The method according to claim 28, wherein the protective film comprises a urethane sheet.

36. The method according to claim 28, wherein the adhesive layer comprises a dry pressure sensitive adhesive.

* * * * *